United States Patent [19]

Wilms

[11] 4,197,203

[45] Apr. 8, 1980

[54] FILTER PRESS

[75] Inventor: Hans Wilms, Menden, Fed. Rep. of Germany

[73] Assignee: Wilms GmbH, Menden, Fed. Rep. of Germany

[21] Appl. No.: 957,261

[22] Filed: Nov. 2, 1978

Related U.S. Application Data

[63] Continuation of Ser. No. 815,114, Jul. 13, 1977, abandoned.

[30] Foreign Application Priority Data

Jul. 16, 1976 [DE] Fed. Rep. of Germany ....... 2631983

[51] Int. Cl.² .............................................. B01D 25/34
[52] U.S. Cl. ..................................... 210/225; 210/230
[58] Field of Search ................................ 210/224–231

[56] References Cited

U.S. PATENT DOCUMENTS

| | | | |
|---|---|---|---|
| 3,232,435 | 2/1966 | Fismer | 210/230 |
| 3,306,455 | 2/1967 | Fismer | 210/230 |
| 3,331,511 | 7/1967 | Kurita | 210/230 |
| 3,360,130 | 12/1967 | Kaga | 210/225 |
| 3,563,386 | 2/1971 | Kurita | 210/230 |

FOREIGN PATENT DOCUMENTS

| | | | |
|---|---|---|---|
| 1288073 | 1/1969 | Fed. Rep. of Germany | 210/230 |
| 1919471 | 1/1970 | Fed. Rep. of Germany | 210/230 |
| 879164 | 10/1961 | United Kingdom | 210/230 |

*Primary Examiner*—Robert H. Spitzer
*Attorney, Agent, or Firm*—Allison C. Collard; Thomas M. Galgano

[57] ABSTRACT

A filter press includes a plurality of filter plates disposed in a row, each having an arm extending laterally outward from the opposite, lateral sides thereof, which are slidably supported on a pair of spaced-apart, parallel tracks, the latter of which are each associated with a synchronously-controlled, reversible chain drive. Each of the plates has a pivot lever mounted on each of the arms thereof, which is movable between a locking position, in which it couples the plate to the preceding plate and, a release position, in which it disengages the plate from the preceding plate. A plurality of cam assemblies are carried on the chain drives, which successively permit individual release of one of the plates from the preceding and succeeding plates, while the remaining succeeding plates remain locked together.

4 Claims, 2 Drawing Figures

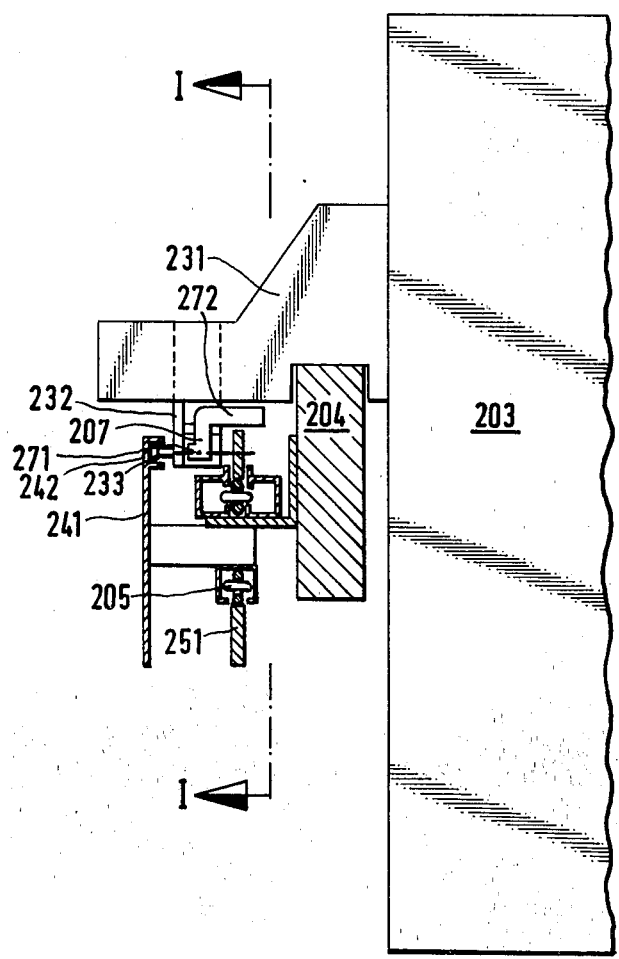

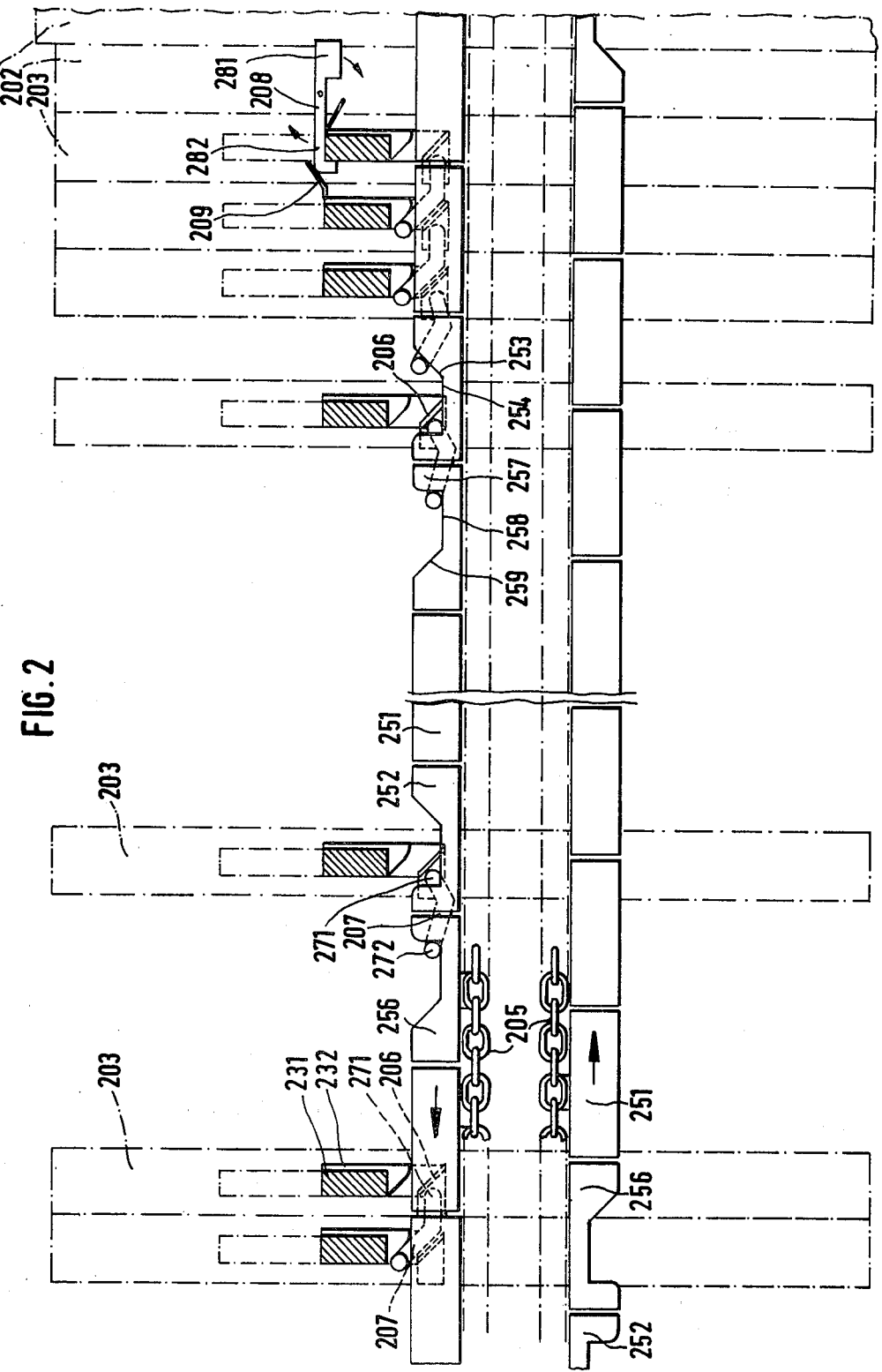

FILTER PRESS

This is a continuation of application Ser. No. 815,114, filed July 13, 1977, now abandoned.

This invention relates to a filter press. More particularly, it relates to a filter press having a plurality of filter plates which are displaceably mounted by means of arms on two support members or tracks.

In presses of this type, parallel to each of the support members is a synchronously-controllable, reversible chain drive provided with associated cams, which engage pivotable levers on the arms and successively separate the adjacently-positioned filter plates in the opening direction (i.e., direction of the chain drive) of the press. The lever on the arm of each plate is vertically pivotable and is provided with a lateral abutment or bends, which is generally horizontally-disposed and parallel to the support members, when the plate is in a release or open position. The lever is pivoted in an upward direction on an inclined abutment when a plate in the opening direction of the press is adjacent to the lever, when the plate is in locked position. The associated lever abutment is released from the cam members of the chain drive when the guide plate engages a preceding locked plate on the inclined abutment.

In actual operation, it has been shown that the adjacent plates in the press are in such a tight relationship with one another that they adhere to each other, in particular if the plates have a relative light weight, so that not one plate by itself is removed from the press, but very often a plurality of plates which adhere to one another.

It is therefore an object of the invention to provide an improved filter press, which overcomes the aforementioned disadvantages.

It is another object of this invention to provide a filter press of the aforementioned type, wherein the filter plates, which follow the filter plate to be removed from the press, are locked in position, whereby the corresponding locking means of each individual plate is automatically released before removal of the plate from the press.

In a preferred embodiment of the invention, on each arm of a filter plate, a specimen is added, which is open at a side face, thus forming an inclined abutment chamber, wherein the pivot lever of the successive plate in the feeding direction is pivoted upwardly, locking the two filter plates to each other in the feeding direction. A cam member, a release member and a plurality of locking members are present on the chain drive, spaced apart from each other, which limits the position of the individual pivot levers on the plate arms. These means in the filter press assure that, during the removal of one filter plate, all successive filter plates to be subsequently removed are locked in position.

In an advantageous embodiment, this locking-in position is carried out by a locking of the filter plates to each other by means of the pivot levers. The unlocking of the subsequent plate is carried out advantageously by the release member.

Other objects and features of the present invention will become apparent from the following detailed description when taken in connection with the accompanying drawings, which disclose a single embodiment of the invention. It is to be understood that the drawings are designed for the purposes of illustration only, and are not intended as a definition of the limits and scope of the invention disclosed.

In the drawings, wherein similar reference numerals denote similar elements throughout the several views:

FIG. 1 is a schematic front view of a filter press embodying the present invention, showing a filter press mounted on a side member, together with the feeding means for the plates; and FIG. 2 is a sectional view along line 1—1 of FIG. 1, showing a portion of the filter plate arrangement.

As can be seen from FIG. 2 (which illustrates only one side of the press for the purpose of clarity), a plurality of filter plates 203 are mounted adjacent to end plate 202 (on the right side of the Figure), which is connected to support 201. Each filter plate 203 is slidably or displaceably mounted, by means of lateral supporting arms 231, on side members 204. Parallel to side members 204, endless chain drives 205 are provided at both sides of the press. Mounted on each of the chain drives 205 in succession, and spaced apart from one another, are a cam member 256, a release member 252 and a plurality of locking members 251. For example, one release member 252 and one cam member 256 follow four locking members 251.

Beneath each supporting arm 231 of filter plates 203, a special formed part 232 is provided, having a side opening forming a chamber defining an inclined abutment 206, in which a pivot lever 207 of the succeeding plate (in the feeding direction) is pivoted upwardly and locks the two filter plates together. This locking position is shown on the right side in FIG. 2 and also in FIG. 1 of the drawings. The upwardly positioned pivot levers 207 rest on the inclined abutment 206 of the preceding filter plate. Beneath bend 272 of levers 207, locking members 251 are mounted in even height on chain drive 205. The filter plate which is provided in front of end or front plate 202, is connected with the same by means of end-locking member 208, consisting of a pivotable lever, having a hook arm 282 at one end which engages arm 231 of filter plate 203. In order to prevent the weight arm 281 at the opposite end of member 280 from releasing hook arm 282 from engagement with plate 203, an abutment plate 209 is provided on the preceding filter plate. Only after this plate 203, together with its abutment plate 209 is removed, can hook arm 282 be released.

Before filter plate 203 can be removed in the direction of the upper arrow, pivot lever 207 of the succeeding filter plate must be released from the chamber of inclined abutment 206. For this purpose, the cam member 256 and release member 252 are adjacently mounted on chain drive 205. From FIG. 2, it can be seen that pivot lever 207 of the filter plate to be removed, will slide over lower edge 259 of cam member 256, into recess 258 and engage with its bend 272 against abutment member 257, while the plate is removed. Simultaneously, pivot lever 207 of the succeeding filter plate moves into recess 254 of releasing member 252, so that the locking between the two plates is released via the pivot lever. The pivot lever of the succeeding plate moves along inclined edge 253 of release member 252, to the height of the following locking member 251. In this position, the chain drive, together with locking member 251, can run beneath lever bend 272. Thereafter, the pivot lever drops into the recess of following cam member 256.

In order to prevent filter plates from being lifted during the feeding movement, and thus removed from the locked position, a guide member 233 is provided, laterally-extending outwardly from special formed part 232, with associated incline abutment 206, which runs in track 242 parallel to chain drive 205. This arrangement can be seen in FIG. 1. Guide track 242 is mounted inside lateral cover 241 of chain drive 205.

After feeding the individual filter plates 203, pivot levers 207, which are pivotably mounted at end 271 beneath incline abutment 206, are moved against incline abutment 206 of the preceding stationary plate. Thereby lever 207 pivots upwardly again, so that member 251, 252 and 256 can move beneath bend end 272 of lever 207. The transported and cleaned filter plates 203, if so desired, are moved into a plate stack on the opposite side of the press. This stack can be moved to the other side of the press for locking.

The device of the invention may be used in principle in a suspended arrangement of a transport device. Thereby the filter plates are suspended from corresponding support tracks. The camming of the filter plates, and the release and locking of the same are carried out in the same manner as disclosed heretofore.

While only one embodiment of the present invention has been shown and described, it will be obvious to those persons of ordinary skill in the art, that many changes and modifications may be made thereunto, without departing from the spirit and scope of the invention.

What is claimed is:

1. A filter press comprising:
a plurality of filter plates disposed in a row, each having an arm extending laterally outward from the opposite, lateral sides thereof, a pivot lever pivotably mounted on each of said arms and disposed generally normally thereto, each of said levers having one end which is pivotably secured to said arm, and an opposite end having a laterally-extending bend, parallel to said arm, which is movable between a locked position, in which said lever assumes a generally vertical disposition, and a release position, in which said lever assumes a generally horizontal disposition, each of said arms of said plates having mounted thereon a member having an opening in a side face thereof, which opens into an inclined abutment chamber having an upwardly inclined abutment face, on which the lateral bend of the lever of the succeeding plate is upwardly pivoted, so as to lock the plates together;
a pair of spaced-apart, parallel tracks, on which the arms of said plates are slidably mounted;
a synchronously-controllable, reversible chain drive associated with each of said tracks, each of which has an upper run which is parallel to said track and which is disposed beneath the arms of said plates, said chains carrying a plurality of spaced-apart, camming assemblies, which are disposed for engagement with said lateral bends of said levers, and which transport said plates along the travel path of the upper run of said conveyors, said camming assemblies successively effecting the individual release of one of said plates by permitting the downward pivoting of the lever arm of said one plate and the lever arm of the succeeding plate to said release positions thereof, so as to permit disengagement of said one plate from the preceding plate and the succeeding plate, while the remaining succeeding plates remain locked together, said camming assemblies each comprising a cam member for permitting downward pivoting of the lateral bend of the lever of one of said plates, to effect movement of said lever of said one plate from said locked position to said release position thereof, and so as to disengage said one plate from the preceding plate, said cam member having a recess formed in the top face thereof for accommodating a lateral bend of the lever of said plates in said release position thereof, said cam member having a camming surface defining a wall of said recess against which said lateral bend engages, to permit transport of the plate along said travel path, a release member for permitting downward pivoting of the lateral bend of the lever of the plate succeeding said one plate, to effect movement of said lever of said succeeding plate from said locked position to said release position, and so as to disengage said one plate from said succeeding plate, said release member immediately following said cam member and being provided with a recess formed in the top face thereof, into which said pivot lever of said succeeding plate engages, said release member also having an inclined edge surface defining a rear wall of said recess thereof, on which the pivot lever of the succeeding plate moves upwardly to the height of a top face of a following locking member and a plurality of locking members following said release member for maintaining the levers of the plates following said succeeding plate in the locked position thereof, said locking members being of the same height and having top faces disposed at a height which maintains said lateral bends of said pivot-lever in said locking positions thereof, said members of said camming assemblies being serially mounted on said chain conveyors, and said pivot-lever being pivoted solely under the influence of gravitational force and its engagement with said camming assemblies and said inclined abutment face.

2. The filter press according to claim 1, wherein said one end of said pivot lever is mounted on said arm beneath said inclined abutment chamber, with the associated incline abutment face.

3. The filter press according to claim 1 additionally including a track disposed parallel to each of said chain drives and wherein said member of each of said arms of said filter plates has a guide member extending laterally-outwardly therefrom, which is slidably supported in one of said tracks.

4. The filter press according to claim 1 additionally including an end plate, disposed behind said plurality of filter plates, which is detachably locked to the preceding plate by means of a tilting lever.

* * * * *